United States Patent

Shirakawa

[11] 4,353,106
[45] Oct. 5, 1982

[54] TRIMMER CAPACITOR

[75] Inventor: Takashi Shirakawa, Morioka, Japan

[73] Assignee: Alps Electric Company, Ltd., Tokyo, Japan

[21] Appl. No.: 174,229

[22] Filed: Jul. 31, 1980

[30] Foreign Application Priority Data

Jul. 31, 1979 [JP] Japan .................. 54-105844[U]

[51] Int. Cl.$^3$ ............................................ H01G 5/06
[52] U.S. Cl. ............................................. 361/293
[58] Field of Search ................................... 361/293

[56] References Cited

U.S. PATENT DOCUMENTS 2,535,367 12/1950 Minnium ........................... 361/293
4,068,285 1/1978 Yamada et al. .
4,101,951 7/1978 Kuze .................................. 361/293

FOREIGN PATENT DOCUMENTS 966466 8/1964 United Kingdom .
2011181 7/1979 United Kingdom .

Primary Examiner—Elliot A. Goldberg
Attorney, Agent, or Firm—Guy W. Shoup; Gerard F. Dunne

[57] ABSTRACT

A trimmer capacitor includes an insulating substrate having recesses to accommodate a dielectric member having the stator electrode printed thereon. A terminal is soldered to the stator electrode and fits within a recess of the insulating plate. A rotor electrode is provided over the dielectric member. The dielectric member does not itself need to be rotated and is adequately supported and thus can be made quite thin even if brittle dielectric material such as titanium dioxide or barium tatinate is used.

3 Claims, 2 Drawing Figures

TRIMMER CAPACITOR

BACKGROUND OF THE INVENTION

The present invention relates to a trimmer capacitor having a ceramic dielectric member.

Generally, trimmer capacitors using ceramic as a dielectric member have a stator electrode, a ceramic dielectric member and a rotor electrode carried on an insulating substrate formed, for example, from a plastics material. The rotor electrode and the ceramic dielectric member are typically attached to a rotor shaft rotatably inserted into the stator electrode and the insulating substrate. The rotor shaft may be rotated to change the confronting area between the rotor electrode and the stator electrode, and the capacitance value may thus be changed.

In a trimmer capacitor of such type, the ceramic dielectric member typically includes titanium dioxide ($TiO_2$) as a main ingredient, and thus has a specific inductive capacitance of 10 to 100 times as large as a general ceramic or plastic film. In addition, a ceramic material having titanium dioxide has excellent electric characteristics such as a good high frequency characteristic. However, such a ceramic dielectric member has poor mechanical elasticity and is very fragile. In the case of a ceramic member made highly dielectric, barium titanate is often used and this causes an increase in the mechanical defects, and the capacitor becomes sensitive to slight mechanical and external factors. The capacitance value set in such capacitors and their electric characteristics thus become unstable with disadvantage.

Therefore, an object of the present invention is to provide a trimmer capacitor of such structure that the mechanical strength of the ceramic dielectric member is increased.

Other object of the present invention is to provide a trimmer capacitor in which the thickness of the ceramic dielectric member can be reduced, to thereby obtain high capacitance values.

A further object of the present invention is to provide a trimmer capacitor having a wide range of capacitance values.

These objects are met by forming the stator electrode directly on the dielectric member and soldering a terminal to the stator electrode. The dielectric member thus need not be rotated and can have its mechanical strength enhanced by the stator electrode and terminal.

Other objects, advantages and features of the present invention will be more apparent from the illustration of the drawing and the description of the embodiment of the present invention.

PREFERRED EMBODIMENT OF THE INVENTION

Figure 1:
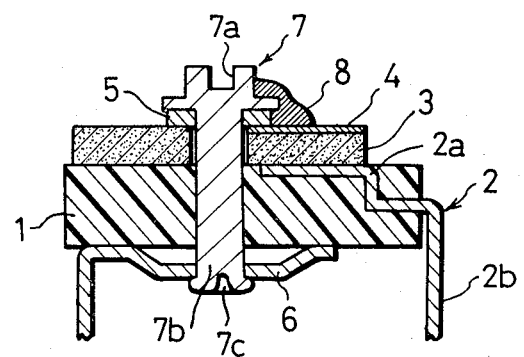
FIG. 1 is a side sectional view of a conventional type of trimmer capacitor.

Prior to explaining an embodiment of the present invention, a conventional trimmer capacitor illustrated in FIG. 1 will be explained briefly.

A reference numeral 1 designates an insulating substrate and 2 a stator electrode which includes an electrode plate 2a of substantially semi-circular shape and an external terminal 2b. The electrode plate 2a is fitted within the substrate 1 with its upper surface exposed by known molding techniques. A reference numeral 3 designates a disc-like ceramic dielectric member and 4 a rotor electrode of substantially semi-circular shape formed on the ceramic dielectric member 3. The rotor electrode 4 is formed by applying a conductive paste such as silver paste or the like on the ceramic dielectric member 3 in a substantially semi-circular shape and then baking. After the electrode plate 2a surface of the stator electrode 2 and an upper surface of the insulating substrate 1 are ground to a smooth finish, the ceramic dielectric member 3 having the rotor electrode formed thereon is placed over the stator electrode 2. An impact absorbing plastic elastic washer 5 functions to reduce any impacts applied to the ceramic dielectric member 3 during rotation of the rotor shaft as mentioned hereinbelow. A reference numeral 6 designates a ground spring lead. 7 designates a rotor shaft which includes an operating portion 7a, a shaft portion 7b and a rotatable holding portion 7c. The shaft portion 7b passes through the plastic elastic washer 5, the ceramic dielectric member 3, the insulating substrate 1 and the ground spring lead 6 and is held rotatably to the spring lead 6 by the holding portion 7c. A reference numeral 8 designates solder and a mechanical and electrical connection is made between the rotor electrode 4 and the rotor shaft 7 by the soldering. A terminal of the rotor electrode 4 is guided through the rotor electrode, the solder, the rotor shaft and the ground spring lead to an external portion.

The conventional trimmer capacitor mentioned above, has the rotor electrode 4 formed by applying conductive material such as silver paste onto the ceramic dielectric member 3 in a substantially semi-circular shape and baking it. The ceramic dielectric member 3 is extremely brittle and, since the rotor electrode 4 rotates integrally therewith and is easily subject to impacts, the thickness of the ceramic dielectric member 3 cannot be reduced arbitrarily. The minimum practical thickness is approximately 3 mm in size, so that it has been difficult to provide a trimmer capacitor having high capacitance value with a wide capacity range while still being compact and having high performance. If the capacitance value and range is to be increased by increasing the specific inductive capacitance of the ceramic dielectric member 3, by increasing the percentage of barium titanate as mentioned above, the mechanical brittleness is increased and the capacitance value set is quite sensitive to mechanical or other external factors and the dielectric characteristic becomes unstable. Therefore, the thickness of the ceramic dielectric member cannot be significantly reduced or further drift in the set capacitance is large, and excellent electric characteristics cannot be maintained. Thus, it has been difficult to provide a compact size for a trimmer capacitor having high capacitance value, covering a wide range and maintaining excellent electric characteristics.

Now, referring to FIG. 2, there will be explained an embodiment of the present invention.

In the drawing, an insulating substrate 11 formed by a ceramic material or plastic material includes a recessed portion 11a for receiving a dielectric member, a recessed portion 11b for accomodating solder, a groove 11c for engaging with an external terminal 12 and an opening for inserting a rotor shaft. The external terminal 12 is fixed to the insulating substrate 11 by an adhesive and disposed so as to fit within the groove 11c formed on the insulating substrate 11. A ceramic dielectric member 13 containing titanium dioxide as a main composition is formed in a thin disc shape. A stator electrode 14 is formed on a bottom surface of the ceramic dielectric member 13 in a substantially semi-circular shape. This stator electrode 14 is formed by printing a conductive paste such as silver paste on the ceramic dielectric member 13 through a screen printing and then baking it. A joint of solder 15 fixes the external terminal 12 electrically and mechanically to the stator electrode 14. An adhesive 16 is applied onto inner surfaces respectively of the recessed portions 11a and 11b of the insulating substrate 11 and the grooves 11c, and functions to fix the ceramic dielectric member 13 to the insulating substrate 11, and the external terminal 12 to the insulating substrate 11. A rotor electrode 17 of substantially semi-circular shape is rotatable with respect to the stator electrode 14 and is supported on the ceramic dielectric member 13 so the confronting area of the two electrodes can be varied. A rotor shaft 18 is made of a conductive material and includes an operating portion 18a, a shaft portion 18b and a rotatable holding portion 18c and is attached so as to rotate the rotor electrode 17 integrally. The shaft portion 18b passes through an opening 13a of the ceramic dielectric member 13 and an opening formed at a center of the insulating frame 11, respectively, protrudes through a bottom portion of the insulating frame 11 and is held rotatably by the holding portion 17c. A ground spring lead 19 is inserted into the shaft portion 18b through which it is electrically connected to the rotor electrode 17.

Now, the assembly of the trimmer capacitor in accordance with the present invention will be given hereinbelow.

On one surface of the ceramic dielectric member 13 having circular shape and provided with the opening 13a at a center thereof, silver paste is printed in a substantially semi-circular shape through a screen printing, and thereafter it is baked to form the stator electrode 14.

Then, the stator electrode 14 and the external terminal 12 are connected mechanically and electrically by soldering.

Thereafter, adhesive material 16 is applied into the recessed portions 11a and 11b of the insulating substrate 11 and the inner surface of the groove 11c. The dielectric member with the terminal 12 soldered thereto is fitted within the recesses 11a and 11b in such a manner that the solder 15 is accommodated in the recessed portion 11b and further the external terminal 12 is within the groove 11c. Then, the laminate thus obtained is subjected to pressure and a temporary adhering, and thereafter, is heated at 100° to 300° C., adhered and solidified, to strongly fix the dielectric member 13 and the terminal 12 to the insulating substrate 11 through the adhesive 16.

Figure 2:
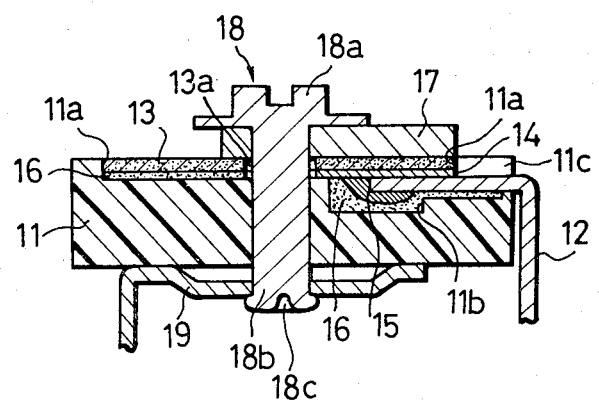
FIG. 2 is a side sectional view of a trimmer capacitor according to the present invention.

Finally, the shaft portion 18b of the rotor shaft 18 to which the rotor electrode 17 is attached is passed through the ground spring lead through the opening 13a of the ceramic dielectric member 13 and the opening formed on the insulating substrate 11 and rotatably held by the holding portion 18c to complete assembly of the trimmer capacitor illustrated in FIG. 2.

When the operating portion 18a is rotated by a screw driver and the like, the rotor electrode 17 rotates together with the rotor shaft 18 integrally, thereby the confronting area between the rotor electrode 17 and the stator electrode 14 can be changed and the capacitance value is changed.

As mentioned above, according to the present invention, the ceramic dielectric member 13 is fixed to the insulating substrate directly through the adhesive 16 and indirectly to the insulating substrate through the external terminal 12 and does not rotate integrally with the rotor electrode 17, so that the mechanical brittleness of the dielectric member 13 can be strengthened and its mechanical strength thus enhanced. As a result of this, the thickness of the ceramic dielectric member 13 can be made approximately ½ in comparison with the conventional one and the trimmer capacitor can be made compact and still have a high capacitance value and a wide range of capacitance value. In addition, since it is not necessary to increase the specific inductive capacitance of the ceramic dielectric member, it is possible to provide a trimmer capacitor of high performance having no damage to electric characteristics such as high frequency characteristics of the ceramic dielectric member.

Furthermore, even though the ceramic dielectric member is fixed to the insulating substrate so as to have a wide adhering area, since there is no adhesive interposed between the ceramic dielectric member and the stator electrode or the external terminal which tends to damage the dielectric characteristic, there can be provided a trimmer capacitor of high performance which can exhibit the dielectric characteristic of the ceramic dielectric member as it is.

What is claimed is:

1. In a trimmer capacitor comprising a rotor electrode, a stator electrode, and a ceramic dielectric member held on an insulating substrate, the rotor electrode being rotatably supported, and the stator electrode and the rotor electrode having a confronting area therebetween changed by rotation of the rotor electrode, the improvement wherein the stator electrode is formed by printing conductive paste onto the dielectric member and a terminal is connected electrically and mechanically to said stator electrode by soldering, said dielectric member and terminal fitting within recesses in the insulating substrate and held therein by adhesive.

2. A trimmer capacitor according to claim 1, wherein the rotor electrode and the stator electrode are both formed in a substantially semi-circular shape.

3. In a trimmer capacitor comprising a rotor electrode, a stator electrode, and a ceramic dielectric member held on an insulating substrate, the rotor electrode being rotatably supported, and the stator electrode and the rotor electrode having a confronting area therebetween changed by rotation of the rotor electrode, the improvement wherein the stator electrode is formed by printing conductive paste onto the dielectric member and a terminal is connected electrically and mechanically to said stator electrode by soldering, said dielectric member and terminal fitting within recesses in the insulating substrate and held therein by adhesive, wherein said recesses of the insulating substrate comprise a shallow first recess for the ceramic dielectric member, a deep second recess for the soldered connection to the terminal and a third recess for the terminal.

* * * * *